(12) United States Patent
DiStefano, III

(10) Patent No.: US 6,631,400 B1
(45) Date of Patent: Oct. 7, 2003

(54) STATEMENT REGARDING FEDERALLY SPONSORED RESEARCH OR DEVELOPMENT

(76) Inventor: Thomas L. DiStefano, III, 2898 NW. 26th St., Boca Raton, FL (US) 33434

( * ) Notice: Subject to any disclaimer, the term of this patent is extended or adjusted under 35 U.S.C. 154(b) by 0 days.

(21) Appl. No.: 09/548,167

(22) Filed: Apr. 13, 2000

(51) Int. Cl.[7] .......................... G06F 15/16; G06F 17/30
(52) U.S. Cl. .............................. 709/206; 707/3; 707/6
(58) Field of Search .................. 707/3, 10, 6; 187/396; 709/206, 224; 705/14

(56) References Cited

U.S. PATENT DOCUMENTS

| | | | |
|---|---|---|---|
| 5,508,817 A | | 4/1996 | Kunigami |
| 5,740,549 A | | 4/1998 | Reilly et al. |
| 5,809,242 A | | 9/1998 | Shaw et al. |
| 5,848,397 A | | 12/1998 | Marsh et al. |
| 5,870,089 A | | 2/1999 | Fabbio et al. |
| 5,892,909 A | | 4/1999 | Grasso et al. |
| 6,023,700 A | * | 2/2000 | Owens et al. .................. 707/10 |
| 6,052,122 A | * | 4/2000 | Sutcliffe et al. ............. 345/751 |
| 6,073,727 A | * | 6/2000 | DiFranza et al. ........... 187/396 |
| 6,119,098 A | * | 9/2000 | Guyot et al. ................... 705/14 |
| 6,317,789 B1 | * | 11/2001 | Rakavy et al. ............... 709/224 |
| 6,381,592 B1 | * | 4/2002 | Reuning ........................ 707/3 |
| 6,449,634 B1 | * | 9/2002 | Capiel ........................ 709/206 |

OTHER PUBLICATIONS

Cranor et al, Spam!, Communications of the ACM, Aug. 1998, ACM Press, vol. 41, Issue 8, p. 74–83.*
Moseley et al, Mastering Microsoft Office 97 professional edition, 1997, SYBEX Inc., 2nd edition, p. 811–816.* http://www.submit2.com/emailmar.shtml.
http://www.targetedemail.com.
http://www.internetral.com/bulk.htm.
http://www.bulletmail.com/targeted-email/index.htm.
http://www.postmasterdirect.com/homeleftbody.mhtm.
http://www.targ-it.com.
http://www.businesslink.net/direct_email_ads.html.
http://www.webthemes.com/email.html.
http://www.healthhomedevice.com/email/platpak.htm.
http://www.webexpos.com/bulk.htm.
http://www.copywriter.com/lists/adlists.htm.

* cited by examiner

Primary Examiner—Viet D. Vu
Assistant Examiner—Kenny Lin
(74) Attorney, Agent, or Firm—Akerman Senterfitt; Steven M. Greenberg

(57) ABSTRACT

A method for managing bulk e-mail distribution can include the steps of matching a target recipient profile with a group of target recipients; transmitting a set of bulk e-mails to the target recipients in the matched group; and, calculating a quantity of e-mails in the set of bulk e-mails which have been successfully received by the target recipients. If the calculated quantity does not exceed a prescribed minimum quantity of successfully received e-mails, the matching, transmitting and calculating steps can be repeated until the calculated quantity exceeds the prescribed minimum quantity. Notably, in the preferred embodiment, the group of target recipients is an opt-in list.

20 Claims, 3 Drawing Sheets

STATEMENT REGARDING FEDERALLY SPONSORED RESEARCH OR DEVELOPMENT

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of bulk electronic mail distribution and more particularly to a system and method for managing bulk electronic mail distribution.

2. Description of the Related Art

The Internet is a new common carrier for information which has already signaled major transformations in virtually all segments of society, in virtually every corner of the globe. At this early and fervent stage of development, Internet usage is widespread among individuals and business entities. Among individuals and business entities, electronic mail (e-mail) is an often used component of the Internet. More and more, individuals and business entities rely upon e-mail as a secondary, if not primary, means of communications with other individuals and business entities.

Prior to the advent of e-mail, conventional marketeers utilized bulk mail sent through the U.S. Postal Service in order to reach an audience of potential customers. Naturally, the Internet provided a new, more efficient and less expensive medium to transmit bulk mail. Consequently, several organizations have evolved by offering various bulk e-mailing services. Examples of organizations offering bulk e-mailing services include the Internet Web sites http://www.emailtoday.com and http://www.postmasterdirect.com.

Many bulk e-mailing services offer "opt-in" targeted e-mail. In an opt-in bulk e-mailing service, marketing material is bulk e-mailed to a list of recipients. Unlike ordinary bulk e-mail lists, however, the recipients in the opt-in bulk e-mail list can pre-register their preferences to receive marketing material relating to selected topics. Thus, a recipient in an opt-in bulk e-mailing list having an interest in automobiles, but not snow skiing, would receive marketing material bulk e-mailed on behalf of General Motors, Inc., but not Rossignol, Inc. Similarly, a recipient in an opt-in bulk e-mailing list having an interest in reading, but not bicycling, would receive marketing material bulk e-mailed on behalf of Barnes and Noble, Inc., but not Schwinn, Inc.

Many of the opt-in bulk e-mailing services permit a customer to select from a number of categorized bulk e-mailing lists. As a result, each categorized bulk e-mailing lists contain a list of recipients having an interest in the corresponding category. Moreover, often, the price charged to the customer for a bulk e-mailing can be based on the selected category. Alternatively, the price charged to the customer for a bulk e-mailing can depend on the number of e-mails sent.

Still, present bulk e-mailing services do not provide an optimized level of efficiency. Specifically, the timing of a bulk e-mail transmission can bear upon the effectiveness of the bulk e-mail. For example, a bulk e-mail transmitted to a business on a Friday evening may not be read until Monday morning. By then, however, the bulk e-mail can become buried among a multiplicity of other e-mails transmitted between Friday afternoon and Monday morning. As a result, the recipient is less likely to find time to read the ill-timed bulk e-mail.

In addition, often the opt-in bulk e-mail lists contain out-dated e-mail addresses for opt-in recipients. In consequence, it is possible for bulk e-mails targeted for a recipient to never reach the intended target. Unfortunately, present bulk e-mail systems cannot identify the effectiveness of a bulk e-mail transmission by recognizing those bulk e-mails not reaching their target recipient. Moreover, present bulk e-mail systems cannot ensure the effectiveness of a bulk e-mail transmission by re-transmitting those bulk e-mails recognized as not reaching their target recipient. Finally, present bulk e-mail systems do not report to a customer on the overall effectiveness of the bulk e-mail transmission. Hence, bulk e-mail customers cannot effectively evaluate the efficiency of a bulk e-mail service.

SUMMARY OF THE INVENTION

A method for managing bulk e-mail distribution can include the steps of matching a target recipient profile with a group of target recipients; transmitting a set of bulk e-mails to the target recipients in the matched group; and, calculating a quantity of e-mails in the set of bulk e-mails which have been successfully received by the target recipients. If the calculated quantity does not exceed a prescribed minimum quantity of successfully received e-mails, the matching, transmitting and calculating steps can be repeated until the calculated quantity exceeds the prescribed minimum quantity. Notably, in the preferred embodiment, the group of target recipients is an opt-in list.

The transmitting step can comprise the steps of: selecting among the group of target recipients a subset of target recipients; and, transmitting the set of bulk e-mails to the subset of target recipients. Where a subset of target recipients is selected among the group of target recipients, the repeating step can comprise the steps of: if the calculated quantity does not exceed the prescribed minimum quantity of successfully received e-mails, selecting among the group of target recipients a new subset of target recipients and repeating each of the matching, transmitting and calculating steps using the new subset of target recipients until the calculated quantity exceeds the prescribed minimum quantity.

A method for managing bulk e-mail distribution can further comprise the steps of: calculating an assessment corresponding to the prescribed quantity of e-mails and the target recipient profile; and, charging the assessment to a subscribing marketeer. Moreover, the method can further comprise the steps of: calculating among the quantity of e-mails in the set of bulk e-mails which have been successfully received by the target recipients, a quantity of e-mails opened by the target recipients. If the quantity of opened e-mails does not exceed a prescribed minimum quantity of opened e-mails, each of the matching, transmitting and both calculating steps can be repeated until the quantity of opened e-mails exceeds the prescribed minimum quantity.

In the preferred embodiment, the transmitting step can include the steps of: specifying a date and time for transmitting the set of bulk e-mails; and, transmitting the set of bulk e-mails to the target recipients in the matched group at the specified date and time. In addition, the method can further comprise the step of generating a status report identifying a quantity of e-mails successfully transmitted to the target recipients and a quantity of e-mails successfully received by the target recipients. The status report can further identify e-mails opened by the target recipients. Finally, the status report can be transmitted by e-mail to a subscribing marketeer.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The present invention concerns a method for providing automated Internet bulk e-mail, data report, and response services. Unlike prior art bulk e-mail systems, the method can ensure delivery of a specified quantity of bulk e-mail to a specified group of target recipients. In addition, unlike prior art bulk e-mail services, users of a system incorporating the inventive method can specify the time and date of initial delivery of the bulk e-mails. In order to ensure the delivery of a specified quantity of bulk e-mail to a specified group of target recipients, the inventive method can monitor the status of each e-mail initially transmitted to the group of target recipients. If a specified quantity of bulk e-mail is not successfully received by the target recipients, the method can select additional target recipients and transmit an additional quantity of bulk e-mail to the additional target recipients. The process can repeat until the specified quantity of bulk e-mail has been successfully delivered.

Figure 1:
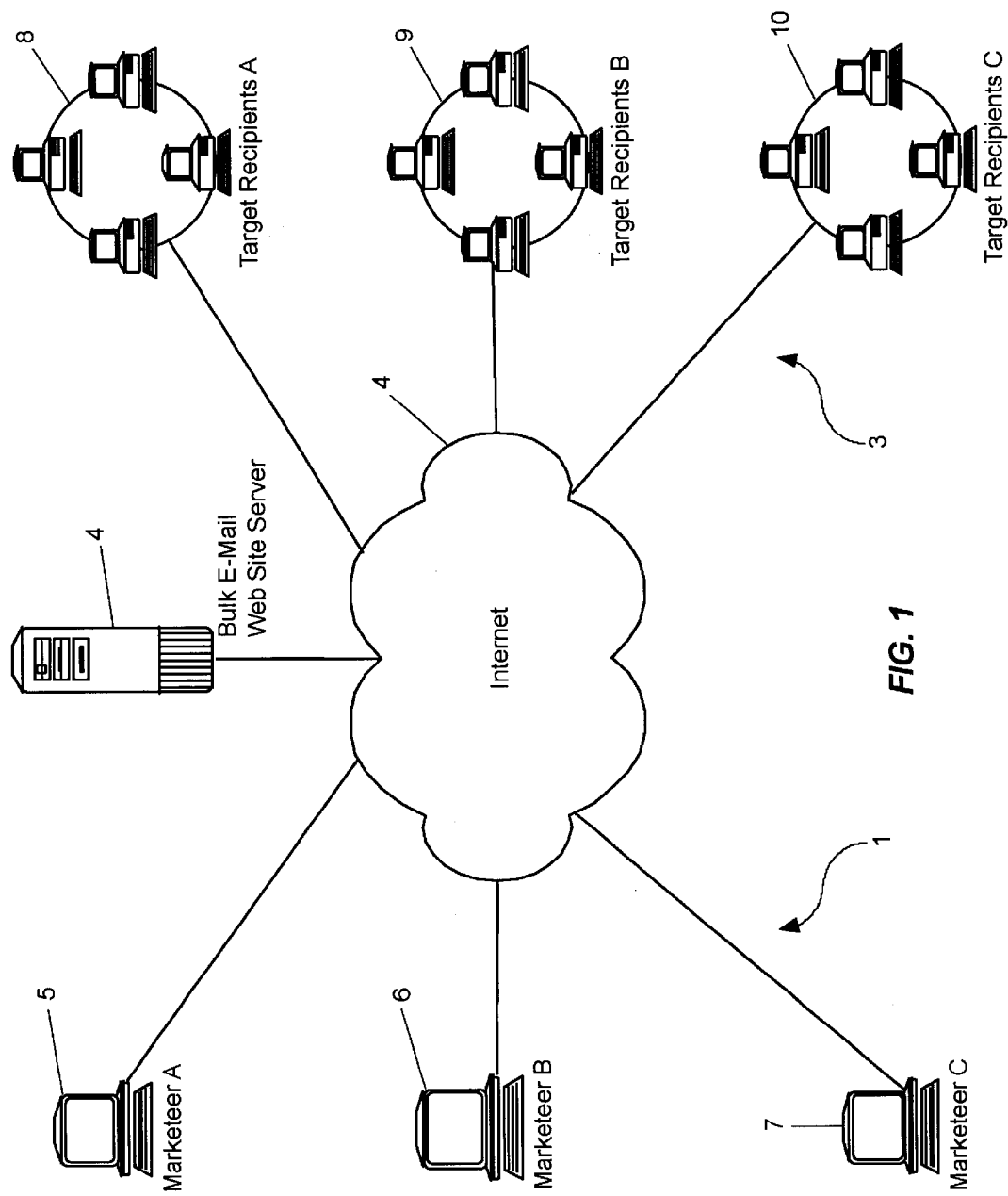
FIG. 1 is a schematic representation of a system for managing bulk e-mail distribution.

The method can be implemented in a system for managing bulk e-mail distribution. FIG. 1 illustrates a system for managing bulk e-mail distribution. The system can include marketeers 1 who are clients of the system, groups of target recipients 3 who are potential customers of the marketeers 1, a bulk e-mail Web site server 2 for brokering the relationship between the marketeers 1 and the groups of target recipient 3, and the Internet 4 which performs the role of a communications medium.

In a system for managing bulk e-mail distribution, each group of target recipients 3 represents an opt-in list of target recipients. Specifically, each target recipient chooses to become a member of a particular group according to marketing preferences. That is, those target recipients interested in bicycling can be grouped into the group of target recipients A 8. Similarly, those target recipients interested in movies can be grouped into the group of target recipients B 9. Finally, those target recipients interested in politics can be grouped into the group of target recipients C 10. By selecting particular groupings, each group of target recipients 3 can receive bulk e-mails relating only to the selected preference corresponding to the selected grouping. Hence, recipients in group A 8 can receive only bulk e-mails relating to bicycling, recipients in group B 9 can receive only bulk e-mails relating to movies, and recipients in group C 10 can receive only bulk e-mails relating to politics. Still, nothing herein limits a recipient to membership in merely one group. Rather, any recipient can belong to a multiplicity of groups. Furthermore, the above illustrative groupings are for illustrative purposes only. The present invention is not limited in this regard. Rather, the system can incorporate any number of groups relating to an unrestricted type of grouping.

In order to present marketing material to the groups of target recipients 3 residing on the Internet 4, marketeers 1 can register a preferred target recipient profile with the bulk e-mail Web site server 2. Using the registered target profile, the bulk e-mail Web site server 2 can identify target recipients having interests relating to the marketing material, and transmit the marketing material to the identified target recipients. In consequence of the grouping of the target recipients, each marketeer offering a particular type of product or service, for example, marketeer A 5 offering bicycles, marketeer B 6 offering video rentals, and marketeer C 7 soliciting political campaign donations, can transmit bulk e-mail containing the marketing material directly to those target recipients having a particular interest in the subject matter of the marketeers 1. For instance, marketeer A 5 can transmit bulk e-mail only to the group of target recipients A 8, who have an interest in bicycling products. Similarly, marketeer B 6 can transmit bulk e-mail only to the group of target recipients B 9, who have an interest in movie-related products. Finally, marketeer C 7 can transmit bulk e-mail only to the group of target recipients C 10, who have an interest in politics. As before, however, the above examples are presented for illustrative purposes. The invention is not limited in this regard. Rather, the marketeers 1 can provide bulk e-mails relating to any number and type of products and services to the groups of target recipients 3 through the bulk e-mail Web site server 2.

Figure 2:
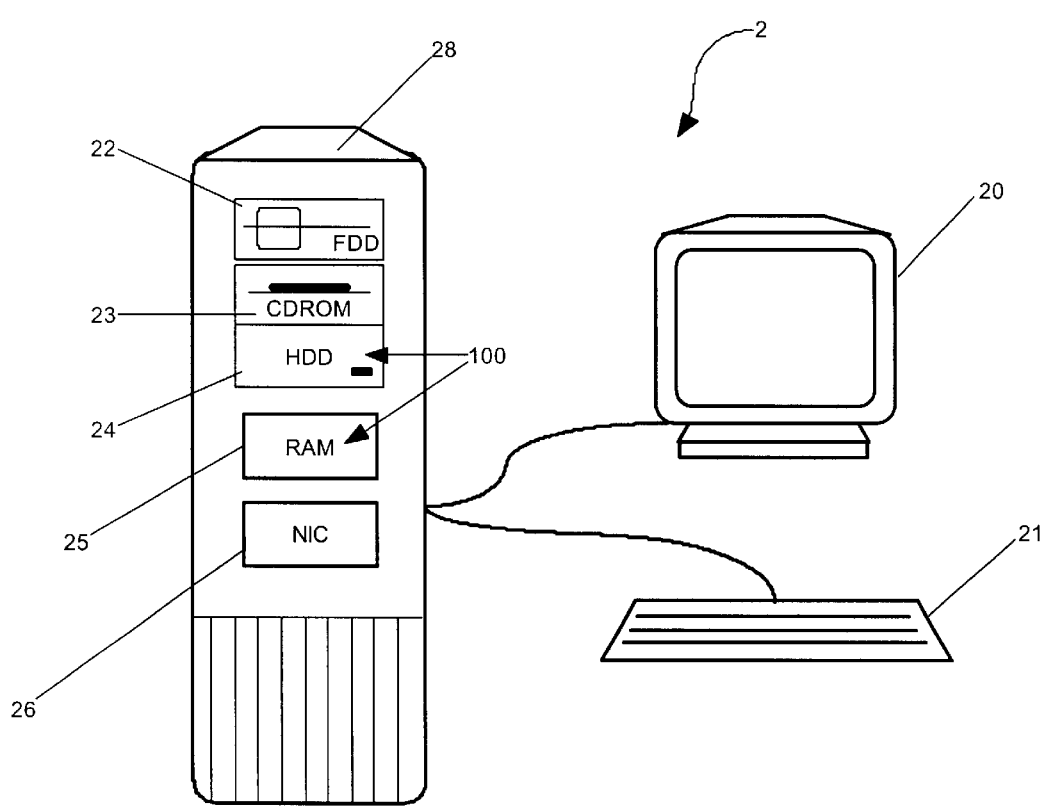
FIG. 2 is an illustration of a bulk e-mail Web site server suitable for performing a method for managing bulk e-mail distribution.

FIG. 2 illustrates a bulk e-mail Web site server 2 suitable for use in the present invention. A bulk e-mail Web site server 2 in accordance with the inventive arrangements can be implemented in a computer system using commercially available software development tools for example Microsoft Visual InterDev® 6.0 from Microsoft Corporation of Redmond, Wash. The bulk e-mail Web site server 2 can be preferably comprised of a computer system 28 including a central processing unit (CPU), one or more memory devices and associated circuitry. The computer system 28 can further include at least one user interface display unit 20 such as a video data terminal (VDT) and a keyboard 21, both operatively connected to the computer. The computer system 28 also can include a floppy disk drive (FDD) 22, compact disc drive (CD-ROM) 23, fixed disk drive (HDD) 24, random access memory (RAM) 25 and suitable network interface circuitry (NIC) 26. Still, neither the VDT 20, keyboard 21, FDD 22, or CD-ROM 23 are necessary for the operation of the bulk e-mail Web site server 2.

The computer system 28 can include an operating system (OS) stored in the HDD 24 and, upon execution, loaded in RAM 25. The OS can include any suitable OS for example Linux freely downloadable from the Internet at http://www.linux.org, WindowsNT available for a fee from Microsoft Corporation of Redmond, Wash., or Solaris available for a fee from Sun Microsystems, Inc. of Palo Alto, Calif. In the preferred embodiment, a Web server can execute on top of the OS. Examples of suitable Web servers include, but are not limited to the Apache Web Server freely downloadable from the Internet at http://www.linux.org, Internet Information Server available for a fee from Microsoft Corporation of Redmond, Wash. and iPlanet Web Server Enterprise Edition 4.0 (formerly Netscape Enterprise Server) available for a fee from Sun Microsystems, Inc. of Palo Alto, Calif.

The HDD 24 can be any commercially available fixed disk drive, for example the Caviar line of hard disk drives marketed by Western Digital Corporation of Irvine, Calif. The HDD 24 can communicate with the computer system 28 through any suitable interface, for example Fast-ATA, SCSI or IDE. The HDD 24 can further store the above-identified OS and the Web server. Naturally, both the OS and the Web server can communicate with the HDD 24 using conventional file I/O methods, well known in the art. Notably, a routine set of instructions for performing the inventive method 100 can be stored in the HDD 24.

Remote computers, for example the marketeers 1 on the Internet 4 as shown in FIG. 1, can communicate with the Web server residing in the bulk e-mail Web site server 2 through the NIC 26. The NIC 26 can be any suitable network interface card, for example those Ethernet adapter cards available from 3COM Corporation of Santa Clara, Calif. Significantly, the above-identified OSs and Web servers can connect to the Internet through commercially available Ethernet adapter cards.

The CPU can be comprised of any suitable microprocessor or other electronic processing unit, as is well known to those skilled in the art. An example of such a CPU would include the Pentium or Pentium II brand microprocessor available from Intel Corporation or any similar microprocessor. Finally, RAM 25 can be any suitable form of memory, recognizable and utilizable by the OS executing on the computer system 28. Notably, although the routine set of instructions for performing the inventive method 100 can be stored in the HDD 24, upon execution, the method 100 can be loaded into RAM 25 and each instruction contained therein can be executed by the CPU. The various hardware requirements for the computer system as described herein can generally be satisfied by any one of many commercially available high speed personal computers and workstations offered by manufacturers such as International Business Machines Corporation and Sun Microsystems, Inc.

Figure 3:
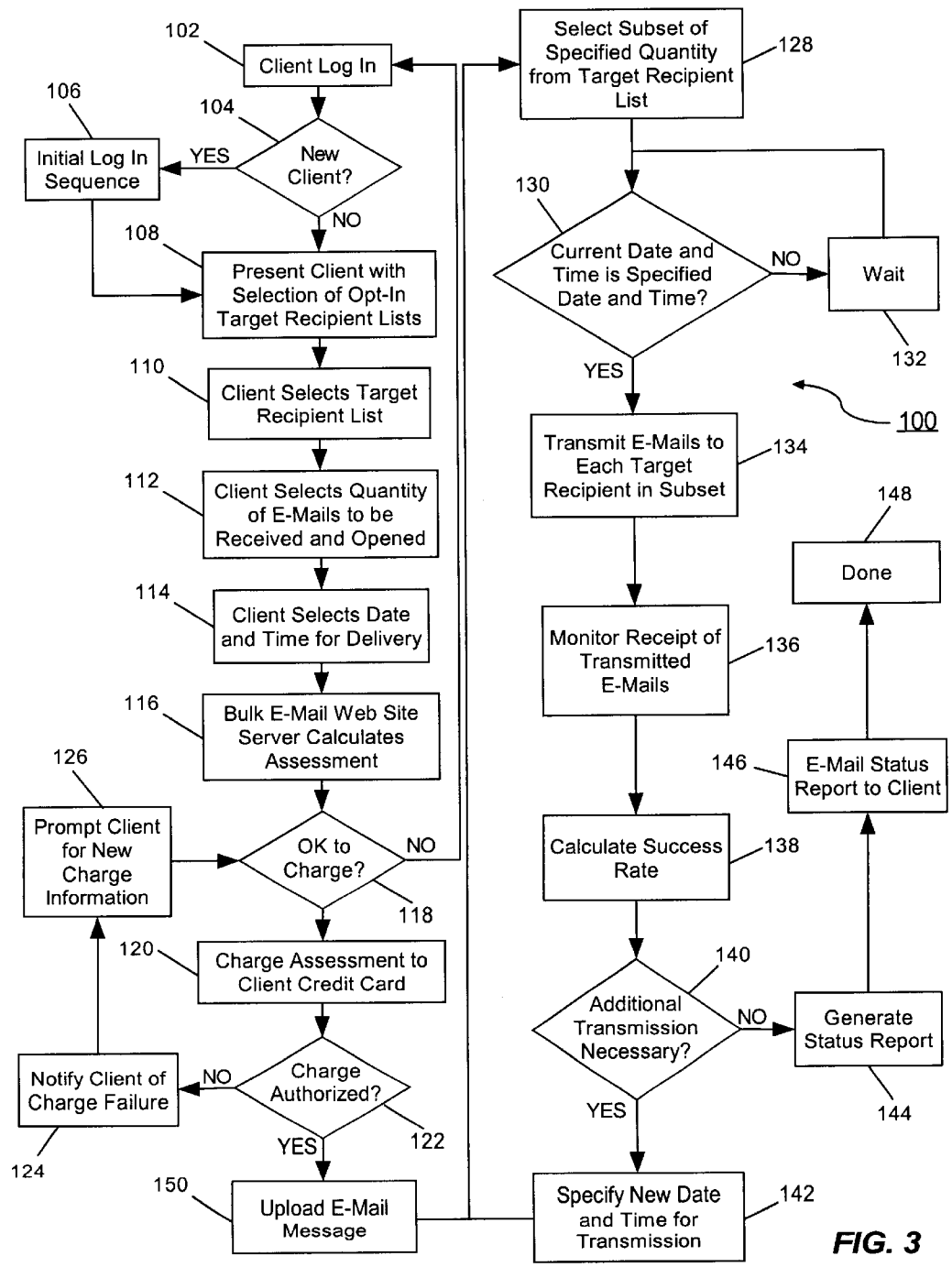
FIG. 3 is a flow chart illustrating a method for managing bulk e-mail distribution.

FIG. 3 is a flow chart illustrating a method for managing bulk e-mail distribution. Briefly, the method can include the steps of matching a target recipient profile selected by a marketeer with a group of target recipients stored in a bulk e-mail web site server. Subsequent to the matching step, the bulk e-mail Web site server can transmit the set of bulk e-mails to the target recipients in the matched list. Subsequently, the bulk e-mail Web site server can calculate a quantity of e-mails in the set of bulk e-mails which have been successfully received by target recipients. If the calculated quantity does not exceed a prescribed minimum quantity of successfully received e-mails, the matching, transmitting and calculating steps can be repeated until the calculated quantity exceeds the prescribed minimum quantity.

The method begins in step 102 in which a remotely situated marketeer can point a Web browser to the Uniform Resource Locator (URL) of the bulk e-mail Web site server (Web Server) and perform a log in routine. In step 104, if the log in routine reveals that the marketeer is a new client of the Web Server, in step 106 the Web Server can collect rudimentary information from the marketeer, for example, name, address, phone number, e-mail address, credit card number and credit card expiration date.

Subsequently, in step 108, the Web Server can present to the marketeer a list of target recipient profiles. Each target recipient profile can represent a collection of target recipients who have opted to receive marketing material relating to a particular topic. As such, preferably, the target recipient profiles can be organized according to topic. Moreover, the topics can be subdivided into sub-topics and so forth, where the entire list of groups of target recipients are organized in a tree-like hierarchy of topics. In step 110, the marketeer can select a listed target recipient profile. Alternatively, in step 110, the marketeer can create a target recipient profile containing information describing the group of individuals that the marketeer would like to target with the bulk e-mail. The individuals can be identifiable based upon, for example, the individuals' hobbies, income level, profession, gender, and age. Using the target information provided by the marketeer, the Web Server can determine an appropriate group of targeted recipients.

Subsequently, in step 112, the marketeer can select the quantity of targeted bulk e-mail that the client would like to send. As an example, the marketeer can choose to send 10,000 bulk e-mails to recipients who have opted-in to a bulk email list consistent with a target recipient profile selected by the marketeer. Advantageously, unlike existing bulk e-mailing systems, in step 114 the marketeer can select a date and time to transmit the bulk e-mail. Upon the marketeer specifying a desired quantity, date and time, in step 116 the Web Server can calculate an assessed price for transmitting the targeted bulk e-mail. In the preferred embodiment, the price correlates to the specificity of the target recipient profile and the quantity of targeted bulk e-mail. Once calculated, the Web Server can transmit to the marketeer the calculated assessment.

The marketeer, upon receiving the calculated assessment, in step 118 can choose whether to proceed with the transaction. Responsive to the marketeer's permission to proceed with the transaction, in step 120 the Web Server can electronically request authorization from the credit card company to charge the calculated fee to marketeer's credit card. If the credit card company fails to authorize payment of the assessment as determined in step 122, in step 124 the marketeer can be notified of the failure. In step 126 the Web Server can prompt the marketeer for new charge information before returning to step 118 to request permission from the marketeer to proceed with the transaction using the new credit card information. After receiving a charge authorization from the credit card company, in step 122 the Web Server can send to the client a message notifying the client that the credit card company has authorized payment. In addition, the bulk e-mail Web site can transmit an electronic invoice to the client.

Once payment has been successfully authorized by the credit card company in step 122, in step 128 the marketeer can choose to proceed with the bulk e-mailing process. Specifically, if the client indicates a willingness to continue, in step 150, the marketeer can create a marketing message to be included in the bulk e-mail. Notably, the marketing message can be a multimedia message having imagery, audio and video in addition to text. Furthermore, the marketeer can indicate to the Web Server a locally or remotely stored file to be incorporated in the message. In fact, in one embodiment, the attachment of a stored file can be substituted in lieu of the step of creating a marketing message. Subsequently, in step 128, a subset of target recipients in the group of targeted recipients can be selected according to the quantity of bulk e-mail selected by the marketeer in step 112. Finally, the created bulk e-mail message can be uploaded to the Web Server for ultimate delivery to each of the targeted recipients in the subset of target recipients.

In step 130, once the bulk e-mail message has been uploaded to the Web Server, the Web Server can enter an idle mode awaiting the a date and time corresponding to the date and time selected by the marketeer in step 114. Specifically, if the current date and time as measured by the Web Server is before the specified date and time, the Web Server in step 132 can merely wait. At or after the specified date and time, in step 134 the Web Server can transmit the bulk e-mail to the each of the targeted recipients included in the selected group of targeted recipients. Upon transmitting the initial set of bulk e-mail, the Web Server can create a preliminary report. Once created, the report can be transmitted to the marketeer. The report preferably indicates whether the initial set of bulk e-mail had been successfully transmitted and the corresponding quantity of bulk e-mail transmitted.

Unlike prior art bulk e-mail systems, advantageously, in step 136 the Web Server can monitor the status of the transmitted bulk e-mail. Specifically, the Web Server can identify bulk e-mail addressed to a recipient on the targeted recipient list, but returned as undeliverable. Hence, in step 138, by identifying undeliverable bulk e-mail, the Web Server can determine the quantity of bulk e-mails successfully received by the targeted recipients. Additionally, the Web Server can request a return receipt with every transmitted e-mail. The return receipt can be transmitted by a targeted recipient when the targeted recipient actually opens the transmitted e-mail for reading. Hence, also in step 138, by examining return receipts, the Web Server can determine the quantity of bulk e-mails successfully received and opened by the targeted recipients.

In step 140, if the Web Server determines, after a pre-specified period of time, that the requested quantity of bulk e-mail has not been successfully received by the targeted recipients, in step 142, the Web Server can specify a new date and time for transmission of an additional set of targeted bulk e-mail to compensate for the undeliverable bulk e-mail. Returning to step 128, the Web Server can select a new subset of target recipients from the selected group of targeted recipients. Using the new subset of target recipients, the Web Server can wait for the new date and time in step 130 and 132 and, in step 134, transmit the bulk e-mail to the new subset of target recipients. The process can repeat using additional subsets of target recipients until the requested quantity of targeted bulk e-mails is successfully received by the targeted recipients.

Finally, upon full delivery of the requested quantity of bulk e-mail, in step 144, the Web Server can generate a final status report to the marketeer. The final status report preferably indicates, for example, the quantity of bulk e-mail transmitted, the quantity of bulk e-mail successfully received and opened, the quantity of bulk e-mail deemed undeliverable, and the quantity of bulk e-mail successfully received, but remaining unopened. In step 146, the status report can be e-mailed to the marketeer and in step 148 the process can terminate.

Thus, a method for managing bulk e-mail distribution can provide an optimized level of efficiency in bulk e-mail distribution. Specifically, the inventive method can identify the effectiveness of a bulk e-mail transmission by recognizing those bulk e-mails not reaching their target recipient. Moreover, a bulk e-mail system in accordance with the inventive arrangements can ensure the effectiveness of a bulk e-mail transmission by re-transmitting those bulk e-mails recognized as not reaching their target recipient. Additionally, the inventive method affords a marketeer control over the timing of a bulk e-mail transmission so that the marketeer can determine an effective timing of the bulk e-mail. Finally, the inventive method can report to a customer on the overall effectiveness of the bulk e-mail transmission. Hence, bulk e-mail marketeers using the inventive system can effectively evaluate the efficiency of the bulk e-mail service.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. A method for managing bulk e-mail distribution comprising the steps:
   (A) matching a target recipient profile with a group of target recipients;
   (B) transmitting a set of bulk e-mails to said target recipients in said matched group;
   (C) calculating a quantity of e-mails in said set of bulk e-mails which have been successfully received by said target recipients; and,
   (D) if said calculated quantity does not exceed a prescribed minimum quantity of successfully received e-mails, repeating steps (A)–(C) until said calculated quantity exceeds said prescribed minimum quantity.

2. The method according to claim 1, wherein said transmitting step comprises the steps of:
   selecting among said group of target recipients a subset of target recipients; and,
   transmitting said set of bulk e-mails to said subset of target recipients.

3. The method according to claim 2, wherein said repeating step comprises the steps of:
   if said calculated quantity does not exceed said prescribed minimum quantity of successfully received e-mails, selecting among said group of target recipients a new subset of target recipients and repeating said steps (A)–(C) using said new subset of target recipients in said transmitting step until said calculated quantity exceeds said prescribed minimum quantity.

4. The method according to claim 1, further comprising the steps of:
   calculating an assessment corresponding to said prescribed quantity of e-mails and said target recipient profile; and, charging said assessment to a subscribing marketeer.

5. The method according to claim 1, wherein said group of target recipients is an opt-in list.

6. The method according to claim 1, further comprising the steps of:
   (E) calculating among said quantity of e-mails in said set of bulk e-mails which have been successfully received by said target recipients, a quantity of e-mails opened by said target recipients; and,
   (F) if said quantity of opened e-mails does not exceed a prescribed minimum quantity of opened e-mails, repeating steps (A)–(C) and (E) until said quantity of opened e-mails exceeds said prescribed minimum quantity.

7. The method according to claim 1, wherein said transmitting step comprises the steps of:
   specifying a date and time for transmitting said set of bulk e-mails; and,
   transmitting said set of bulk e-mails to said target recipients in said matched group at said specified date and time.

8. The method according to claim 1, further comprising the step of generating a status report identifying a quantity of e-mails successfully transmitted to said target recipients and a quantity of e-mails successfully received by said target recipients.

9. The method according to claim 8, wherein said status report further identifies e-mails opened by said target recipients.

10. The method according to claim 8, further comprising transmitting said status report by e-mail to a subscribing marketeer.

11. A machine readable storage, having stored thereon a computer program having a plurality of code sections executable by a machine for causing the machine to perform the steps of:

(A) matching a target recipient profile with a group of target recipients;

(B) transmitting a set of bulk e-mails to said target recipients in said matched group;

(C) calculating a quantity of e-mails in said set of bulk e-mails which have been successfully received by said target recipients; and, (D) if said calculated quantity does not exceed a prescribed minimum quantity of successfully received e-mails, repeating steps (A)–(C) until said calculated quantity exceeds said prescribed minimum quantity.

12. The machine readable storage according to claim 11, wherein said transmitting step comprises the steps of:

selecting among said group of target recipients a subset of target recipients; and, transmitting said set of bulk e-mails to said subset of target recipients.

13. The machine readable storage according to claim 12, wherein said repeating step comprises the steps of:

if said calculated quantity does not exceed said prescribed minimum quantity of successfully received e-mails, selecting among said group of target recipients a new subset of target recipients and repeating said steps (A)–(C) using said new subset of target recipients in said transmitting step until said calculated quantity exceeds said prescribed minimum quantity.

14. The machine readable storage according to claim 11, further comprising the steps of:

calculating an assessment corresponding to said prescribed quantity of e-mails and said target recipient profile; and, charging said assessment to a subscribing marketeer.

15. The machine readable storage according to claim 11, wherein said group of target recipients is an opt-in list.

16. The machine readable storage according to claim 11, further comprising the steps of:

(E) calculating among said quantity of e-mails in said set of bulk e-mails which have been successfully received by said target recipients, a quantity of emails opened by said target recipients; and, (F) if said quantity of opened e-mails does not exceed a prescribed minimum quantity of opened e-mails, repeating steps (A)–(C) and (E) until said quantity of opened e-mails exceeds said prescribed minimum quantity.

17. The machine readable storage according to claim 11, wherein said transmitting step comprises the steps of:

specifying a date and time for transmitting said set of bulk e-mails; and, transmitting said set of bulk e-mails to said target recipients in said matched group at said specified date and time.

18. The machine readable storage according to claim 11, further comprising the step of generating a status report identifying a quantity of e-mails successfully transmitted to said target recipients and a quantity of e-mails successfully received by said target recipients.

19. The machine readable storage according to claim 18, wherein said status report further identifies e-mails opened by said target recipients.

20. The machine readable storage according to claim 18, further comprising transmitting said status report by e-mail to a subscribing marketeer.

\* \* \* \* \*

UNITED STATES PATENT AND TRADEMARK OFFICE
CERTIFICATE OF CORRECTION

PATENT NO. : 6,631,400 B1
DATED : October 7, 2003
INVENTOR(S) : Thomas L. DiStefano, III It is certified that error appears in the above-identified patent and that said Letters Patent is hereby corrected as shown below:

<u>Title page,</u>
Item [54], Title, please replace "STATEMENT REGARDING FEDERALLY SPONSORED RESEARCH OR DEVELOPMENT" with -- METHOD FOR MANAGING BULK E-MAIL DISTRIBUTION --

Signed and Sealed this

Ninth Day of November, 2004

JON W. DUDAS
*Director of the United States Patent and Trademark Office*